Figure 1:
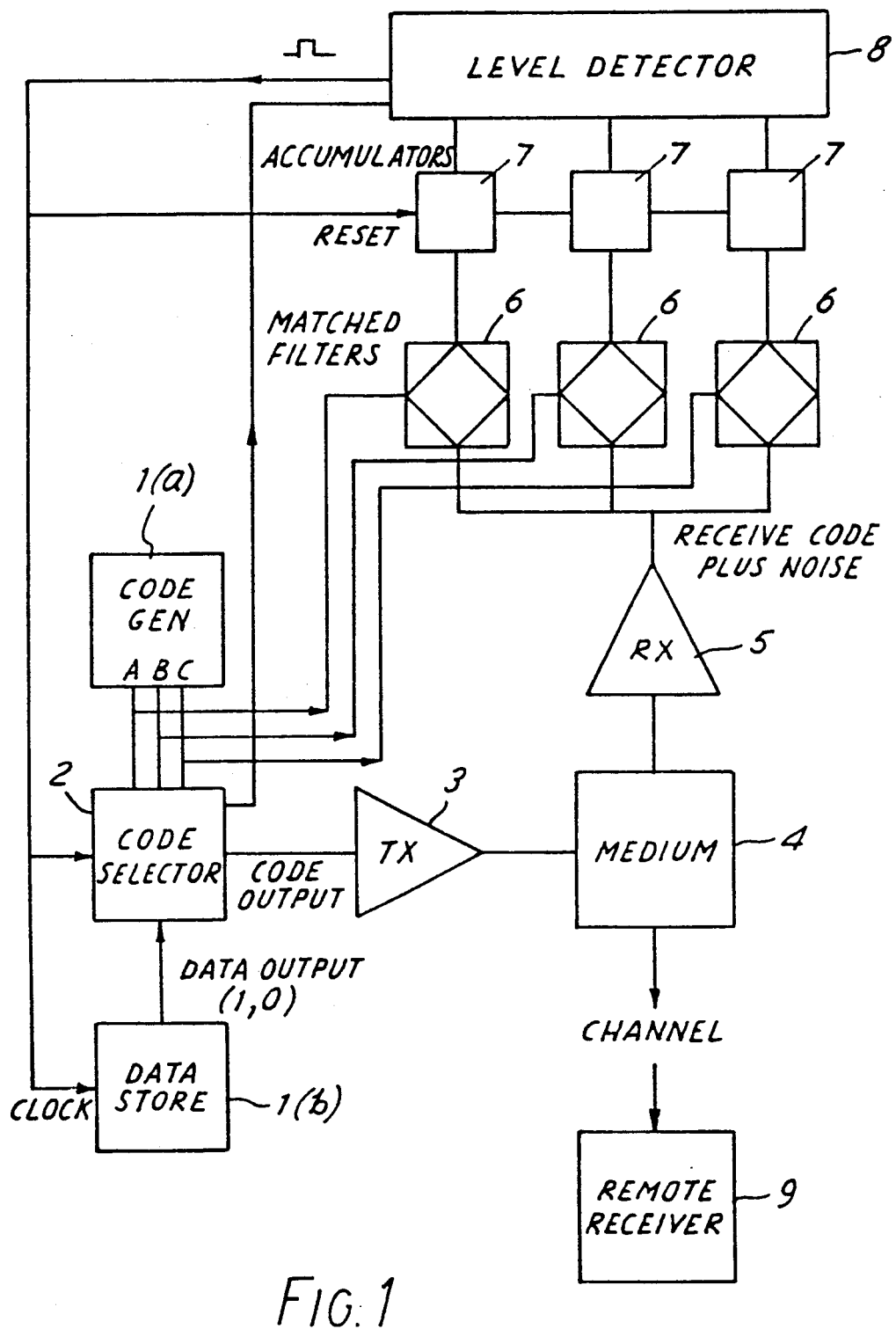

United States Patent [19]

Maufe

[11] Patent Number: 5,079,648
[45] Date of Patent: Jan. 7, 1992

[54] MARKED RECORDED SIGNALS

[75] Inventor: Barry G. Maufe, London, England

[73] Assignee: Thorn EMI plc, London, England

[21] Appl. No.: 340,800

[22] Filed: Apr. 20, 1989

[30] Foreign Application Priority Data

Apr. 20, 1988 [GB] United Kingdom ............... 8809346

[51] Int. Cl.[5] ..................... G11B 27/36; G11B 15/04
[52] U.S. Cl. ........................................ 360/31; 360/60
[58] Field of Search ................ 360/31, 60, 53; 380/2,
380/4, 22; 235/375, 419, 462; 340/825.44,
825.62; 371/6

[56] References Cited

U.S. PATENT DOCUMENTS 4,172,963  10/1979  Belcher et al. ........................ 380/2
4,779,265  10/1988  O'Connor et al. ..................... 370/93
4,876,617  10/1989  Best et al. ............................ 360/60

Primary Examiner—Aristotelis Psitos
Assistant Examiner—Won Tae C. Kim
Attorney, Agent, or Firm—Fleit, Jacobson, Cohn, Price, Holman & Stern

[57] ABSTRACT

An apparatus for monitoring the marking of a recorded signal includes a data store containing marking information and a code selector for selecting any one of three orthogonal codes for marking the recorded signal and a demodulator for demodulating the marked signal and comparing this with the orthogonal codes. The demodulated marked signals are then fed to matched filters and accumulators wherein the marking process may be repeated dependent upon the value of the accumulation.

5 Claims, 1 Drawing Sheet ed with the said confirmation# MARKED RECORDED SIGNALS This invention relates to apparatus for monitoring marking of a recorded signal and in particular, though not exclusively, for monitoring the marking of an audio signal being recorded in a recording medium, such as magnetic tape or grooved disc.

It has become important, particularly in the music recording industry, to be able to identify the source of an audio recording, especially for proving ownership of illegal recordings or for enabling automatic logging of play-back time of the recording for royalty purposes To achieve this a coded 'marking' signal is used to modulate the audio signal being recorded and to thereby mark the recording with the said confirmation identifying the owner of the recording. The marking is carried out in such a way as to render the information substantially imperceptible to an ordinary listener of the recording. The spectrum, over which the coded information is recorded, is made similar to that of the signal being recorded, so that it is difficult to remove, alter or destroy the coded information without seriously impairing the recorded signal. The coded 'marking' signal can then be 'read' up on reception using a 'decoder'.

Sometimes, however, the marking signal of the recorded signal does not record properly and cannot be read by the decoder.

According to the present invention there is provided apparatus for monitoring marking a recorded signal; said apparatus including means for generating a marking signal, means for modulating the signal to be recorded with the marking signal; means for monitoring the modulated marked signal, said monitoring means including a demodulator; and means responsive to said monitoring means so that any of the marking signal which cannot be read by the monitoring means is repeated.

The apparatus preferably also includes a remote receiving means for receiving the marked recorded signal comprising a demodulating means to produce the marking signal on receiving the said marked recorded signal.

The invention will now be further described by way of example only with reference to the accompanying drawing, FIG. 1 which shows a block circuit diagram of a preferred embodiment of the invention.

It is assumed when considering operation of the apparatus of the invention that the requirements of the "feedback coding technique" are satisfied, namely that the noise at the receiver is the same as that at the transmitter. This is valid in that particular case since the system noise is effectively determined by the audio signal itself which is fixed in some respects.

In FIG. 1 a data store 1 (b) contains the desired marking information in binary form. It is the data output of a one or a nought that determines which code the code selector 2 will select.

The selector may choose one of three orthogonal codes "A", "B" or "C" which are stored in the code generator 1(a). These codes can have any desired amplitude or frequency characteristics. There are two predetermined sequences of code changes—one for each data level, eg A-B, B-C, C-A could represent data one and A-C, C-B, B-A data nought.

One of the codes is selected by the code selector 2 depending on the previous code and on the current data input level and is output to transmitter 3, which uses the code to modulate the medium 4. The medium 4 could be an audio signal and the modulator could be amplitude modulator. However, any other modulation technique and medium may be used.

The transmitted signal is demodulated by receiver 5 which forms part of the marking apparatus and fed to matched filters 6 where it is compared with codes "A", "B" and "C". These codes must be delayed to compensate for any delay introduced by the transmitter 3 and receiver 5. The received signal consists of the signal transmitted plus noise due to demodulation of the medium. The outputs of the matched filters 6 are accumulated by accumulators 7 to give the 'signal strength' due to the 'correct' transmitter signal and two spurious 'signal strengths' due to the other codes. A level detector 8 monitors these three accumulations, when the correct accumulation yields a result better than the other two by a given margin, a flag is output by the level detector 8. This margin is determined by the expected loss in the channel (which should be small) and by expected losses in a remote receiver 9.

The flag resets the accumulators 7, selects a new data bit from the data store and requests the code selector 2 to output a new code.

In this way any of the marking signal which cannot be read after demodulation is repeated. Hence the marking of a recorded signal can be monitored to ensure that the coded marking signal can be read upon reception using a decoder.

It can be seen that the data rate of this system continuously varies and is automatically optimised to the signal to noise ratio in the channel. Also the correlation of noise with signal is taken into account—this gives a further improvement in data rate. If the corruption of the medium in the channel is small then error free reception at the remote receiver is guaranteed. In the case of amplitude modulated music certain distortions of the music do not result in significant loss of signal.

The remote receiver 9 is used to read the marked recorded signal in order to identify the owner of the recording and operates in a manner similar to the transmitter demodulator. However, some means of signal locking must be employed as the phase or time shift of the transmitted codes is not known. Reception is by any conventional means except that three codes must be demodulated instead of two. Use of matched filters gives slightly higher process gain than envelope detection. Symbol locking can be a problem in this system. In the "music" implementation pseudo-random codes were used and the receiver was a correlation type. For each bit period a whole number of codes (A, B, C) are transmitted. This greatly eases symbol locking as the correlation peak defines the beginning and end of each code. In a single frequency system such as FSK or PSK the transmitted codes can in principle be any length (at least a few cycles). In this case the accumulators would be low-pass filters instead of bit-period integrators. This gives a slight loss of performance. In the system described three codes are used to represent binary data. This is not very efficient. It can easily be extended such that "n" orthogonal codes are used to represent n minus one data elements. As "n" tends to infinity the system approaches the theoretical limit of performance for any communications system.

Let the present code being transmitted be "x"—then for "n" possible codes there are "n" minus one possible different changes to the next code for each "x". Thus "n" minus one data elements can be represented and all possible permutations of code changes are utilised.

Thus the present invention provides apparatus for monitoring the ability of an encoded marking signal to be decoded before transmission by using code groups which always differ for two adjacent symbols.

I claim:

1. Apparatus for monitoring marking of a recorded signal including: generating means for generating a plurality of marking signals; modulating means for modulating the recorded signal with one of the marking signals; monitoring means for monitoring the modulated marked signal, which means includes a demodulator which provides a demodulated signal comprising the recoreded signal and the one marking signal, comparisonmeans for comparing the magnitude of the one marking signal with the plurality of marking signals thereby to produce an output in dependence upon the differences between the magnitudes such that if the difference does not exceed a predetermined margin, the recorded signal is again modulated with the one marking signal.

2. Apparatus according to claim 1 wherein the comparison means includes matched filters and accumulators.

3. Apparatus according to claim 1 wherein the generating means for generating a plurality of marking signals comprises a code generator for generating three orthogonal codes.

4. Apparatus according to claim 3 wherein the generating means further comprises a binary data store.

5. A method of monitoring marking of a recorded signal, the method including: generating a plurality of marking signals; modulating the recorded signal with one of the marking signals; monitoring the marked signal including demodulating the marked signal providing the recorded signal and said one marking signal; comparing the magnitude of said one marked signal with the plurality of marking signals thereby producing an output in dependence upon the differences between the magnitudes such that if the difference does not exceed a predetermined margin, the recorded signal is again modulated with the one marking signal.

* * * * *